(12) United States Patent
Kim

(10) Patent No.: US 10,315,167 B2
(45) Date of Patent: Jun. 11, 2019

(54) APPARATUS FOR HEAT-TREATING INNER SIDE SURFACE OF BRAID FOR HOLLOW FIBER MEMBRANE REINFORCEMENT FOR WATER TREATMENT AND BRAID FOR HOLLOW FIBER MEMBRANE REINFORCEMENT FOR WATER TREATMENT MANUFACTURED USING THE SAME

(71) Applicant: Im Sun Kim, Chogye-myeon (KR)

(72) Inventor: Im Sun Kim, Chogye-myeon (KR)

( * ) Notice: Subject to any disclaimer, the term of this patent is extended or adjusted under 35 U.S.C. 154(b) by 382 days.

(21) Appl. No.: 15/295,652

(22) Filed: Oct. 17, 2016

(65) Prior Publication Data
US 2017/0144108 A1   May 25, 2017

(30) Foreign Application Priority Data
Nov. 24, 2015  (KR) .................. 10-2015-0164490

(51) Int. Cl.
| | |
|---|---|
| *H05B 3/42* | (2006.01) |
| *H05B 3/44* | (2006.01) |
| *B01D 69/10* | (2006.01) |
| *C02F 1/44* | (2006.01) |
| *B01D 69/08* | (2006.01) |
| *B01D 69/02* | (2006.01) |
| *B01D 61/02* | (2006.01) |

(52) U.S. Cl.
CPC .......... *B01D 69/105* (2013.01); *B01D 69/02* (2013.01); *B01D 69/08* (2013.01); *B01D 69/081* (2013.01); *C02F 1/44* (2013.01); *H05B 3/44* (2013.01); *B01D 61/025* (2013.01); *B01D 2323/08* (2013.01); *B01D 2323/286* (2013.01); *B01D 2323/42* (2013.01); *B01D 2325/24* (2013.01); *H05B 3/42* (2013.01)

(58) Field of Classification Search
None
See application file for complete search history.

(56) References Cited

U.S. PATENT DOCUMENTS

| | | | | |
|---|---|---|---|---|
| 5,389,763 A | * | 2/1995 | Nagan .................. | H05B 1/0252 219/221 |
| 5,406,053 A | * | 4/1995 | Masreliez ............ | B23K 3/0315 219/229 |
| 2015/0292739 A1 | * | 10/2015 | Harada .................... | H05B 3/06 219/534 |

* cited by examiner

*Primary Examiner* — Joseph M Pelham
(74) *Attorney, Agent, or Firm* — Paratus Law Group, PLLC

(57) ABSTRACT

Disclosed herein are an apparatus for heat-treating an inner side surface of a braid for a hollow fiber membrane reinforcement for a water treatment and a braid for a hollow fiber membrane reinforcement manufactured using the heat-treatment apparatus, wherein a fiber tissue forming an inner side surface of a braid becomes dense, and the inner diameter of the braid can be expanded, and the circularity of the inner and outer diameters can be accurate, and a compressive strength can be increased, whereby the physical property of a reinforcement membrane of a hollow fiber can be enhanced, and a filtration reliability and water penetration can be improved, thus obtaining an increased service life of a product and an economical saving effect.

5 Claims, 8 Drawing Sheets

(a)

(b)

APPARATUS FOR HEAT-TREATING INNER SIDE SURFACE OF BRAID FOR HOLLOW FIBER MEMBRANE REINFORCEMENT FOR WATER TREATMENT AND BRAID FOR HOLLOW FIBER MEMBRANE REINFORCEMENT FOR WATER TREATMENT MANUFACTURED USING THE SAME

TECHNICAL FIELD

The present invention relates to an apparatus for heat-treating an inner side surface of a braid for a hollow fiber membrane reinforcement for a water treatment, and in particular to an apparatus for heat-treating an inner side surface of a braid for a hollow fiber membrane reinforcement for a water treatment and a braid for a hollow fiber membrane reinforcement manufactured using the heat-treatment apparatus, wherein a fiber tissue forming an inner side surface of a braid becomes dense, and the inner diameter of the braid can be expanded, and the circularity of the inner and outer diameters can be accurate, and a compressive strength can be increased, whereby the physical property of a reinforcement membrane of a hollow fiber can be enhanced, and a filtration reliability and water penetration can be improved, thus obtaining an increased service life of a product and an economically saving effect.

BACKGROUND ART

The braid, in general, is made in such a way to weave a plurality of layered yarns and is used to manufacture an electric wire or a hose, a binding string and is used in a water treatment filtration field.

Meanwhile, a filtration method implemented using a hollow fiber membrane applied, for example, to a water treatment field is being widely used in a filtration field, for example, an industrial waste water treatment, a sewage and waste treatment and a high water purification for a water supply. In recent years, such a filtration method is being increasingly applied to a pretreatment of a RO system, a bacteria free water for a medicine, a fish farm and a leisure facility.

The typical hollow fiber membrane, however, has a disadvantage in the way that since its tensile strength and compressive strength are low, it may be easily broken by an external impact or if it is used for a long time, a filtration reliability and a water penetration performance may be greatly degraded due to various impurities or sludge which are adhered to the surface of the membrane.

In order to resolve the aforementioned problems, a hollow fiber reinforcement membrane is developed and currently used, which is implemented in such a way that a braid weaved into a tubular shape using a filament yarn or a drawing textured yarn is employed as a reinforcing member, and a membrane thin film is coated on the surface of the braid, by which a mechanical strength (a tensile strength and a compressive strength) can be increased, thus extending a service life of the product, and a filtration reliability and a water penetration performance can be enhanced.

The above-described braid for a hollow fiber reinforcement membrane, however, has a disadvantage in the way that if a braid weaved using a filament yarn is used for the reinforcement of a hollow fiber membrane, the inner diameter of the braid can be increased; however the peeling strength of the membrane film may become weak, for which the membrane can be easily peeled off, and the service life of the hollow fiber membrane may be decreased, thus lowering the filtration reliability. If the braid weaved using the drawing textured yarn is used at a hollow fiber reinforcement membrane, the adhering force with the surface of the braid of the membrane film may be increased, which may result in an increased peeling strength, so the service life of the membrane can be increased, and the filtration reliability can be improved; however the inner diameter thereof may be decreased, for which the water penetration performance may be significantly degraded.

Moreover, when weaving a braid for a reinforcement membrane of a hollow fiber in such a way to use a filament yarn or a drawing textured yarn, since the size of the inner diameter of the braid and the circularities of the inner and outer diameters are key elements to determine the performance of the water penetration of the hollow fiber reinforcement membrane and the filtration reliability and the service life of the product, a high carbon steel wire called a piano wire of a diameter of 0.8~2.0 mm is disposed in the center at an inner side of the woven layered yarn, wherein the diameter may differ based on the material of the layered yarn and the number of carriers of a braiding machine, in order to expand the inner diameter of the braid and enhance the circularity, and the length of the portion covered by the layered yarn may be about 5~10 mm long, and the layered yarn is woven around the portion, thus manufacturing a braid.

When the layered yarn is woven around the steel wire, the inner diameter may be greatly expanded; however if it is woven out of the steel wire, it might be directly contracted due to the elasticity and tensile strength of the layered yarn, and it may be easily deformed during the procedures where it passes through a drawing device and the braid is loaded, for which it may become hard to maintain a circular shape.

In addition, the contraction and deformation may occur during a coating procedure of a membrane film and before or after a heat treatment, so the enhanced effects in terms of the expansion of the inner diameter of the braid and the circularities of the inner and outer diameters may be expected a little, but such effects are weak.

PRIOR ART DOCUMENTS

Patent Documents

1. The Korean utility model registration number 20-0311089
2. The Korean utility model registration number 20-0193461

DISCLOSURE OF THE INVENTION

Accordingly, it is an object of the present invention to provide an apparatus for heat-treating an inner side surface of a braid for a hollow fiber membrane reinforcement for a water treatment and a braid for a hollow fiber membrane reinforcement manufactured using the heat-treatment apparatus, wherein a fiber tissue forming an inner side surface of a braid becomes dense, and the inner diameter of the braid can be expanded, and the circularity of the inner and outer diameters can be accurate, and a compressive strength can be increased, whereby the physical property of a reinforcement membrane of a hollow fiber can be enhanced, and a filtration reliability and water penetration can be improved, thus obtaining an increased service life of a product and an economical saving effect.

To achieve the above objects, there is provided an apparatus for heat-treating an inner side surface of a braid for a hollow fiber membrane reinforcement for a water treatment, which may include, but is not limited to, a heating core which is formed of a heating part disposed at the top thereof and having a contracted diameter, wherein the heating core is made of a copper or a copper alloy; a heater which is configured to heat the heating core and to receive electric power through an electric wire coated with a braid; a tubular shaft the inside of which is vertically passed through and through which the electric wire passes, wherein a male screw part is formed at a circumference of the top thereof; a clamping nut the inside of which is vertically passed through and which is configured to cover the tops of the heating core and the shaft, wherein a female screw part thread-engaged with the male screw part of the shaft is formed at the inner, lower portion thereof; and an installation part which is equipped with a tubular body defined in the center thereof and a shaft fixing part to which the lower side of the shaft is engaged, wherein a bracket is formed protruding at the circumference of the shaft fixing part for the sake of an installation at a braiding machine.

Advantageous Effects

In an apparatus for heat-treating an inner side surface of a braid for a hollow fiber membrane reinforcement for a water treatment and a braid for a hollow fiber membrane reinforcement manufactured using the heat-treatment apparatus of the present invention, heat is supplied based on the physical property that a hollow fiber reinforcement membrane needs at an inner side surface thereof when weaving a tubular braid using a filament yarn or a drawing textured yarn, thus melting and contracting the inner side surface of the braid, by which the tissue at the inner side surface of the braid can be made dense, and the inner diameter of the braid can be expanded, and the circularities of the inner and outer diameters can be enhanced, and the compressive strength can be increased, which may result in the enhanced membrane physical property of the hollow fiber reinforcement membrane, and the improved filtration reliability and water penetration performances, and the extended service life of the product, and the reduced cost.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE INVENTION

Figure 1:
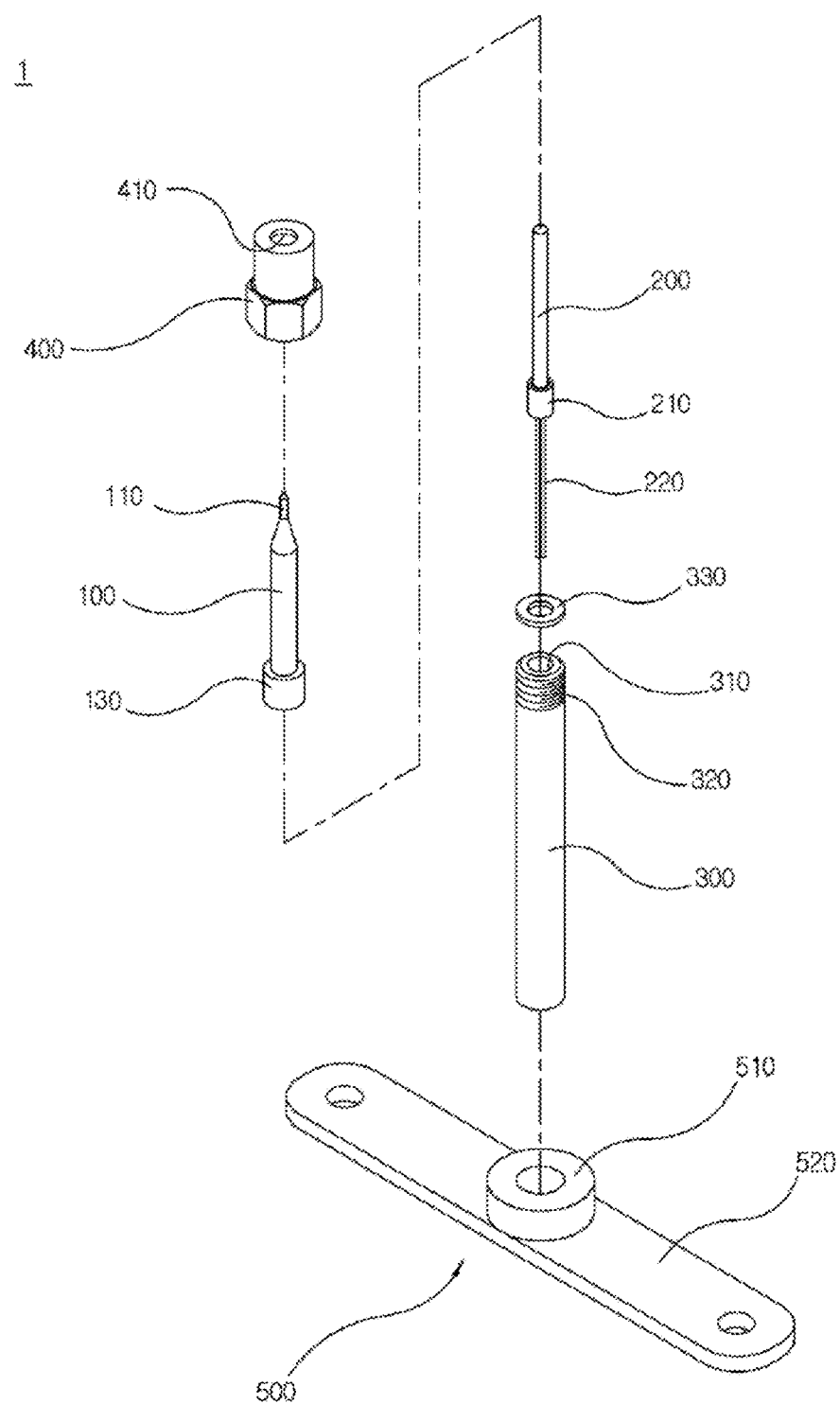
FIG. 1 is a disassembled perspective view illustrating an apparatus for heat-treating an inner side surface of a braid for a hollow fiber membrane enforcement for a water treatment according to the present invention.

The terms or words used throughout the specification and claims should not be limitedly interpreted based on a typical or dictionary meaning, but should be interpreted as matching with the technical principles of the present invention based on a principle where the inventor is able to most appropriately define the concepts of the terms so as to described his invention in the best way.

The embodiments recited in the present specification and the configuration illustrated in the drawings are referred just to the most preferred embodiment of the present invention, not representing all the technical principles of the present invention, so it should be understood that various equivalents and modifications may be available, which could substitute such principles at the time of filing.

The preferred embodiments of the present invention will be described with reference to the accompanying drawings.

Figure 2:
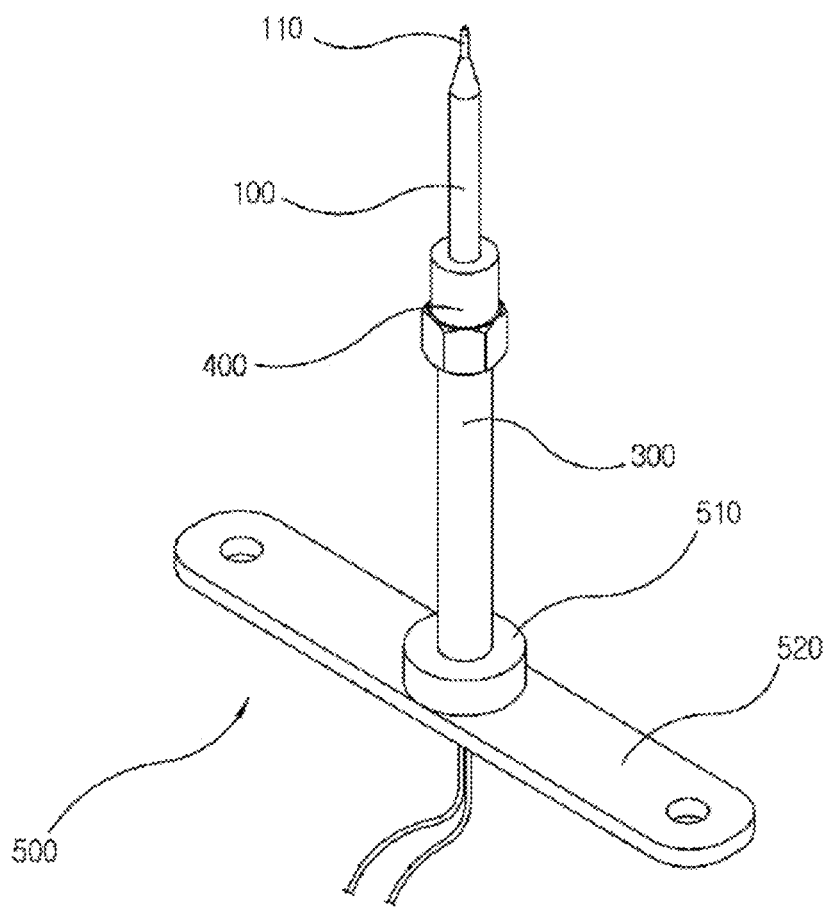
FIG. 2 is an engaged perspective view illustrating an apparatus for heat-treating an inner side surface of a braid for a hollow fiber membrane reinforcement for a water treatment according to the present invention.
Figure 3:
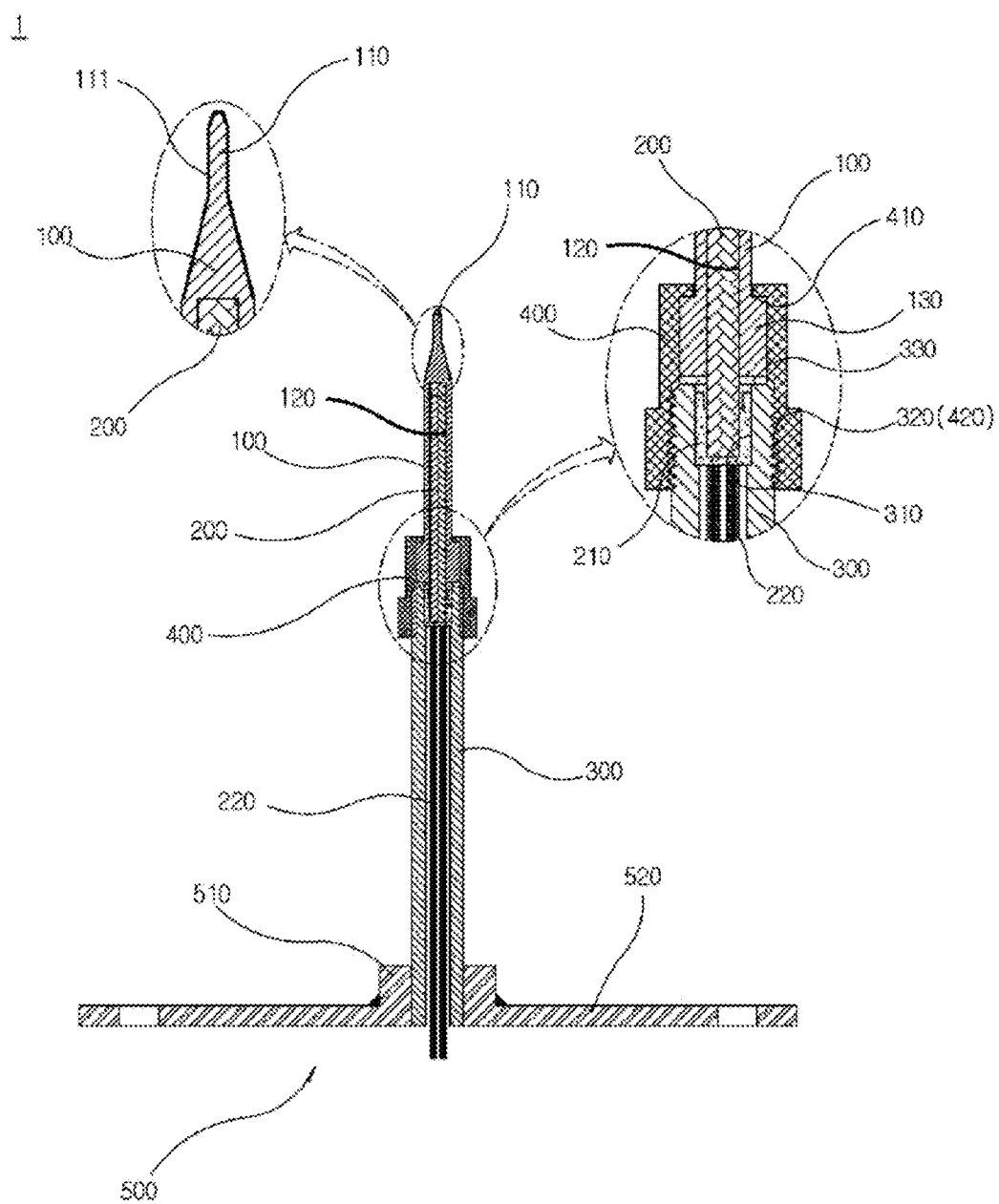
FIG. 3 is a cross sectional view illustrating an apparatus for heat-treating an inner side surface of a braid for a hollow fiber membrane reinforcement for a water treatment according to the present invention.

FIG. 1 is a disassembled perspective view illustrating an apparatus for heat-treating an inner side surface of a braid for a hollow fiber membrane enforcement for a water treatment according to the present invention, FIG. 2 is an engaged perspective view illustrating an apparatus for heat-treating an inner side surface of a braid for a hollow fiber membrane reinforcement for a water treatment according to the present invention, and FIG. 3 is a cross sectional view illustrating an apparatus for heat-treating an inner side surface of a braid for a hollow fiber membrane reinforcement for a water treatment according to the present invention.

Referring to FIGS. 1 to 3, the apparatus 1 for heat-treating an inner side surface of a braid for a hollow fiber membrane enforcement for a water treatment according to the present invention may include, but is not limited to, a heating core 100, a heater 200, a shaft 300, a clamping nut 400 and an installation part 500.

The heating core 100 is configured to supply heat to an inner side surface of the braid while the braid (not illustrated) is being woven, and the material thereof may be a copper (Cu) having a second highest thermal conductivity after a silver (Ag), and the heating temperature can be most optimally adjusted in such a way to change the voltage which is supplied to the heater 200 based on the physical property that the material of the layered yarn or the hollow fiber reinforcement membrane need.

The heating core 100 may be formed in a vertical and circular rod shape. A heating part 110 may be formed at the top thereof having a reduced diameter. The heat can be supplied to the braid through the heating part 110. The heating part 110 may have a diameter of 0.5~30 mm and a length of 5.0~30 mm.

A heater engaging groove 120 may be formed at the heating core 100, wherein the inner side of the heater engaging groove 120 is open downward, which allows for an engagement to the heater 200. An engaging support part 130 having an expanded diameter may be formed at the circumference of the lower side thereof.

Meanwhile, a chrome plating layer 521 may be coated on the heating part 110 of the heating core 100 in order for the surface thereof to have a smooth surface illumination by which the braid can be smoothly separated while the braid is being woven.

The heater 200 may be connected to the heating core 100. In the present embodiment of the present invention, the heater 200 may be inserted into the heater engaging groove 120 through the bottom of the heating core 100, wherein the bottom thereof is formed protruding and may be covered by an insulator 210.

Moreover, the heater 200 may be connected through an electric wire 220 coated with a braid, thus generating heat after it receives electric power through the electric wire.

The heater 200 is able to generate heat, and the heat is transferred to the heating core 100, and the heat transferred to the heating core 100 is supplied to the braid through the heating part 110.

The shaft 300 may be formed in a tubular shape the inside of which is vertically passed through, and the electric wire 220 passes through the inside of the shaft 300 while protecting the electric wire 220. An insulator support groove 310 may be formed at an inner side of the top, and the insulator 210 covering the lower side of the heater 200 is inserted and fixed, and the top thereof contacts close to the lower side of the engaging support part 130 of the heating core 100 with an insulation washer 330 being interposed between them, thus supporting the heater 200.

The insulation washer 330 may be made of an epoxy resin or a ceramic or a material having a low thermal conductivity, which is referred to the characteristic of an insulator, so the transfer of the heat of the heating core 100 to the shaft 300 can be prevented.

A male screw part 320 may be formed at the circumference of the top of the shaft 300.

The clamping nut 400 may be configured to allow a connection force between the heating core 100 and the shaft 300, and the inside of the clamping nut 400 may be vertically passed through.

An engaging shoulder 410 may be formed at the top of the clamping nut 400, wherein the engaging shoulder 410 is formed protruding inward for the top of the engaging support part 130 of the heating core 100 to be hooked and supported, and a female screw part 420 may be formed at a lower inner side thereof and may be thread-engaged with a male screw part 320 of the shaft 300.

The clamping nut 400 is covered from the top of the heating code 100 and may cover the tops of the engaging support part 130 of the heating core 100 and the shaft 300 and may be thread-engaged with the aid of the male screw part 320 and the female screw part 420 of the shaft 300. It may pressed and fix the top of the engaging support part 130 of the heating core 100 through the engaging shoulder 410 during the screw engagement.

The installation part 500 is employed to install the heat-treating apparatus 1 of the present invention at a braiding machine (not illustrated), wherein a shaft fixing part 510 formed of a tubular body may be provided in the center thereof, so the lower side of the shaft 300 can be engaged inserted into the same. A bracket 520 may be formed protruding from the circumference of the lower side of the shaft fixing part 510 for the sake of an installation at the braiding machine.

At this time, the bracket 520 is not limited thereto. Various configurations may be adapted based on the kinds and types of the braiding machine. The bracket 520 is preferably installed at the top of the braiding machine.

Figure 4:
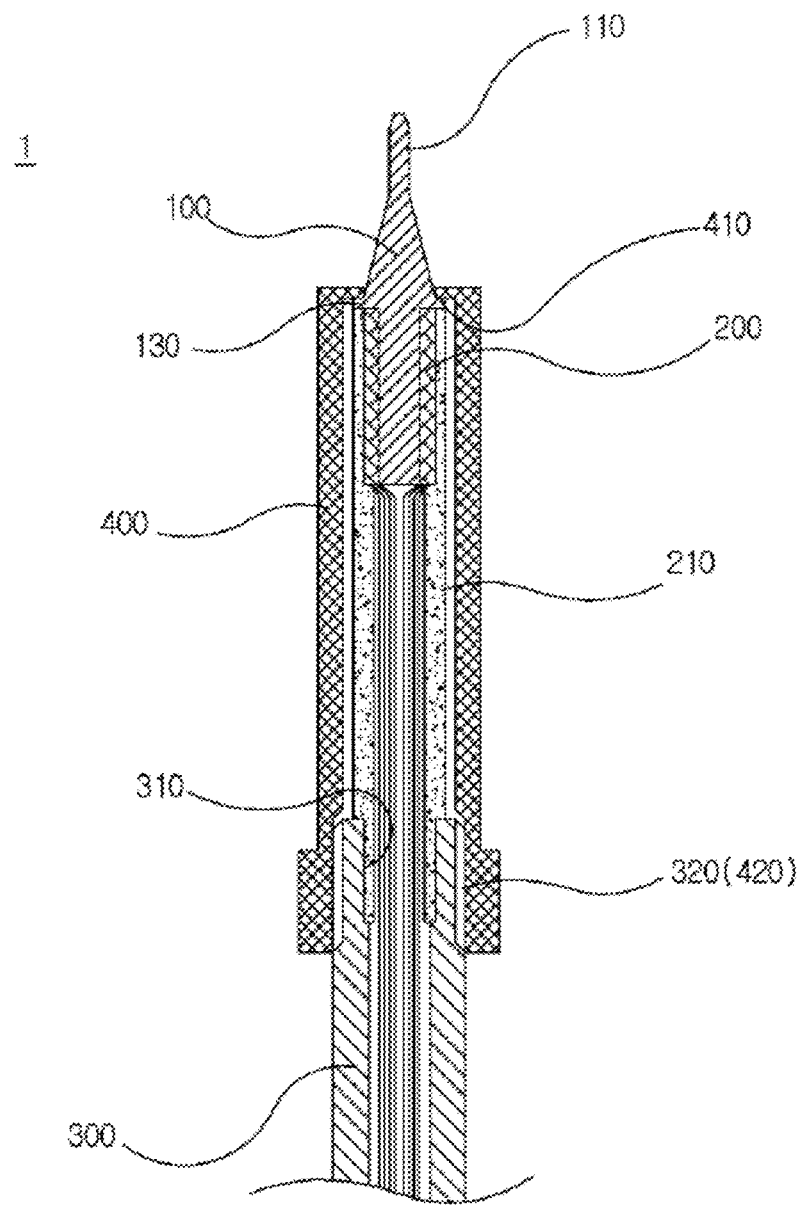
FIG. 4 is a cross sectional view for describing another embodiment of an apparatus for heat-treating an inner side surface of a braid for a hollow fiber membrane reinforcement for a water treatment according to the present invention.

When configuration the apparatus 1 for heat-treating an inner side surface of a braid for a hollow fiber membrane enforcement for a water treatment, as illustrated in FIG. 4, another embodiment of the heating core 100, the heater 200, the shaft 300 and the clamping nut 400 may be adapted.

In the heating core 100, an engaging support part 130 may be formed at the circumference of the intermediate part at the lower side of the heating part 110.

The heater 200 may be disposed covering the lower side of the heating core 100, thus heating the heating core 100, and the circumference thereof may be formed protruding downward and may be covered with the insulator 210 configured to cover the electric wire 220 together, so the heater 200 can receive electric power via the electric wire 220, thus generating heat.

In the shaft 300, an insulator support groove 310 may be formed at an inner side of the top, and the insulator 210 may be inserted therein, and a male screw part 320 may be formed at the circumference of the top.

Moreover, the clamping nut 400 the inside of which is vertically passed through, may be configured to cover the engaging support part 130 of the heating core 100 and the top of the shaft 300, and an engaging shoulder 410 configured to hook and engage the top of the engaging support part 130 may be formed at the top thereof. When it is engaged with the male screw part 320 of the shaft 300 through the female screw part 320, the engaging support part 130 of the heating core 100 can be pressed and fixed.

Meanwhile, when the heater 200 is adapted, the kinds thereof are not limited, and it may be made of a ceramic, a heating cable or a predetermined member which is able to generate heat in the form of a high frequency or an ultrasonic wave.

The operation of the apparatus for heat-treating an inner side surface of a braid for a hollow fiber membrane enforcement for a water treatment according to the present invention will be described with reference to the accompanying drawings.

Figure 5:
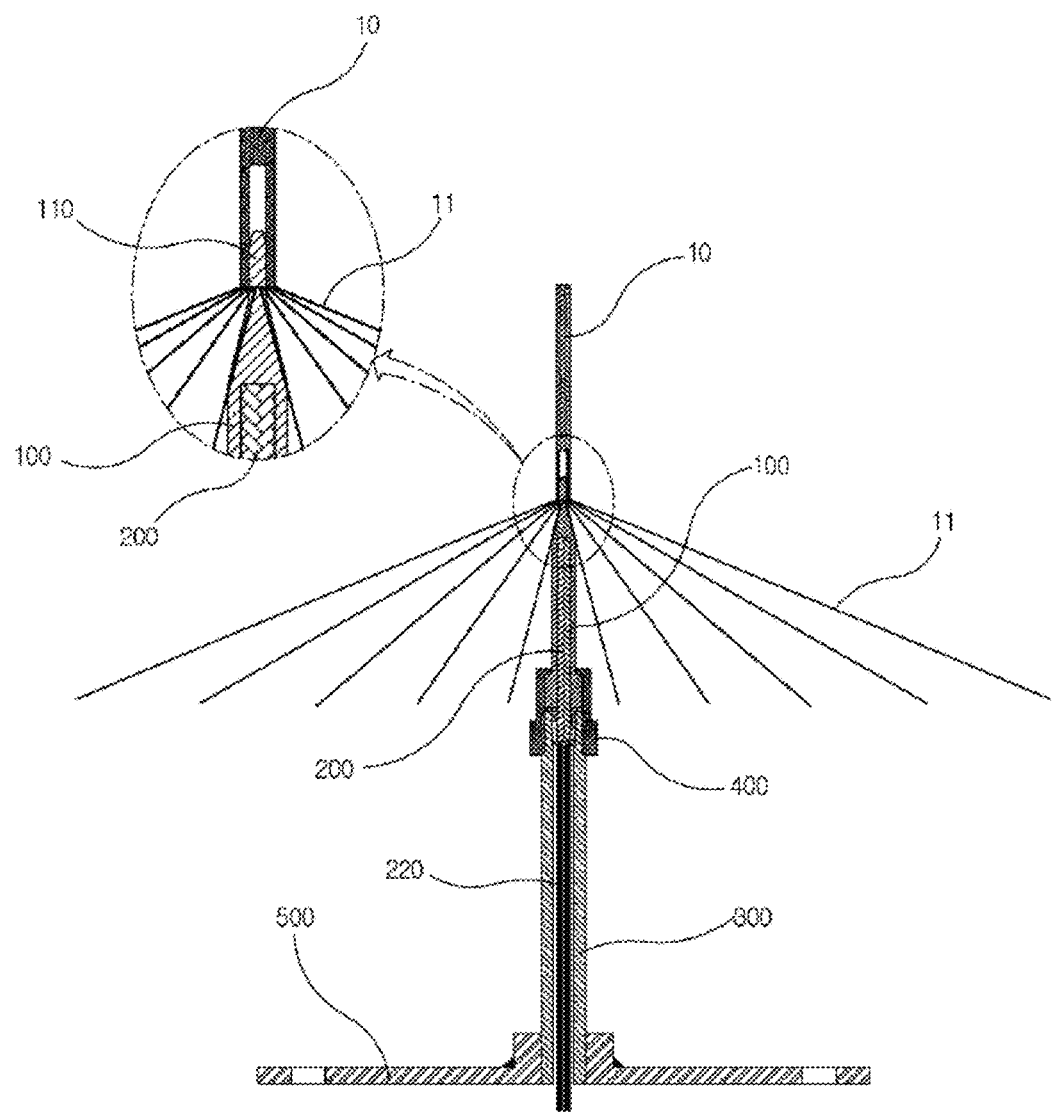
FIG. 5 is a view illustrating a heat treatment state of an inner sider surface when weaving a braid in such a way to use an apparatus for heat-treating an inner side surface of a braid for a hollow fiber membrane for a water treatment according to the present invention.
Figure 6:
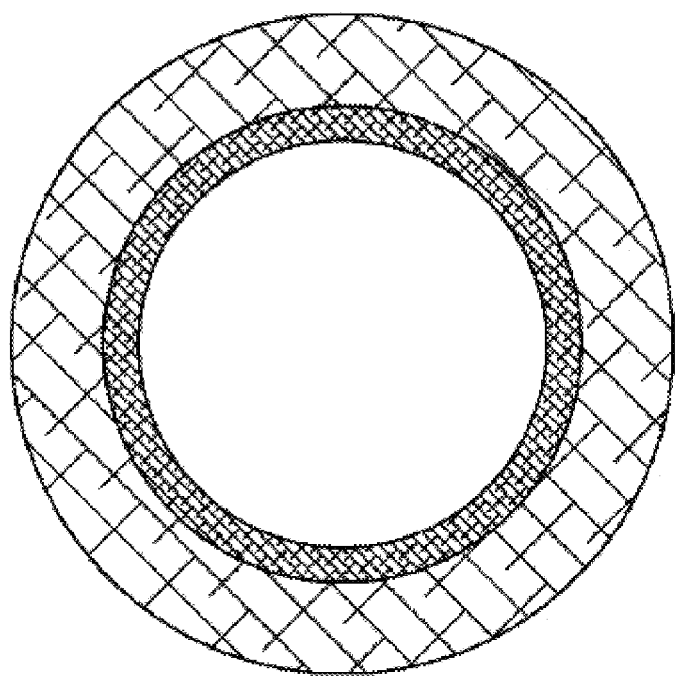
FIG. 6 is a cross sectional view illustrating a braid which is manufactured by an apparatus for heat-treating an inner side surface of a braid for a hollow fiber membrane for a water treatment according to the present invention.

In the apparatus 1 for heat-treating an inner side surface of a braid for a hollow fiber membrane enforcement for a water treatment according to the present invention, as illustrated in FIG. 5, the layered yarn 11 is woven on an outer circumferential surface of the heating core 100 while a braid is being woven using the layered yarn 11 formed of a filament yarn or a drawing textured yarn. While the weaving is being carried out, the heating core 100 may supply heat to the layered yarn and the inner side surface of the woven braid, by which the inner side surface of the braid can be melted and contracted by the heat.

If electric power is supplied to the heater 200 through the electric wire 220, heat may generate at the heater 200. The thusly generated heat may be transferred to the heating core 100 and may heat the heating part 110. The inner side surface of the braid which is being woven, can be melted by the heat of the heating part 110, through which the braid 10 the inner side surface of which has been heat-treated, can be manufactured.

It is obvious that the heating temperature can be adjusted to the optimum level by changing the voltage supplied to the heater 200 based on the material of the layered yarn or the physical property that the hollow fiber reinforcement membrane needs.

Figure 7:
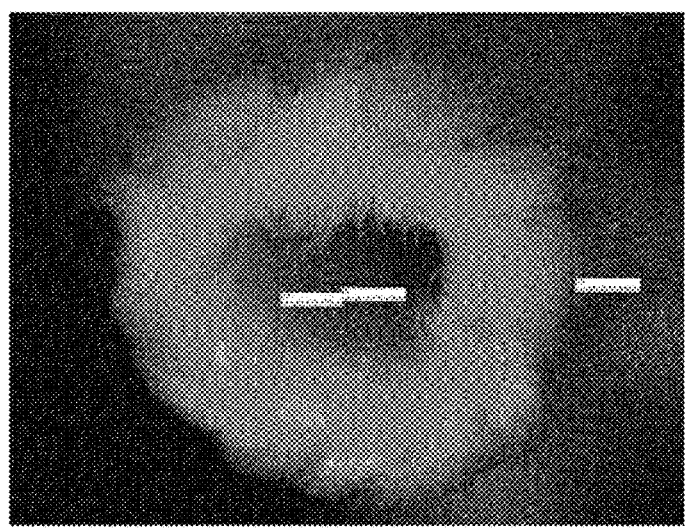
FIG. 7 is a view illustrating an actual product comparison between a braid manufactured by an apparatus for heat-treating an inner side surface of a braid for a hollow fiber membrane for a water treatment according to the present invention and a conventional braid.
Figure 7:
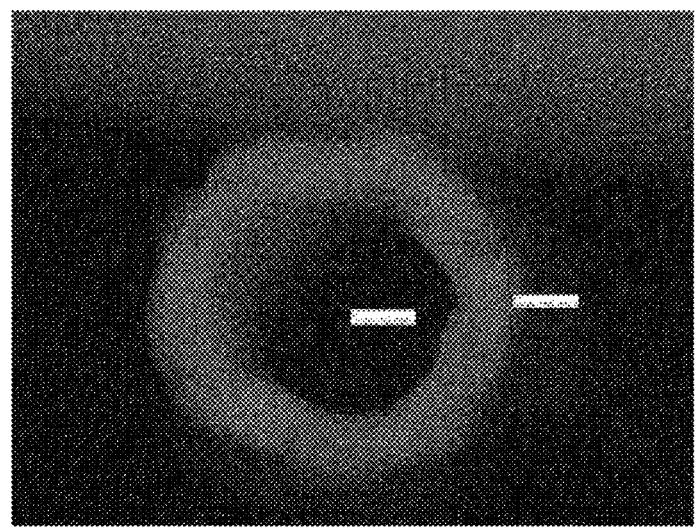
Figure 8A:
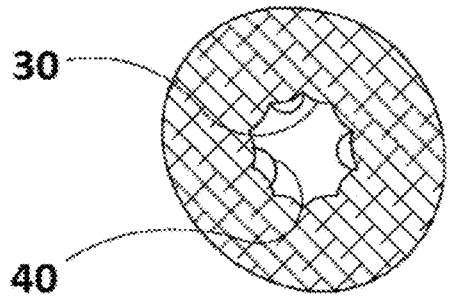
FIGS. 8A-8E illustrate a comparison example between a braid manufactured by a conventional method and a braid manufactured by an apparatus for heat-treating an inner side surface of a braid for a hollow fiber membrane for a water treatment according to the present invention.
Figure 8D:
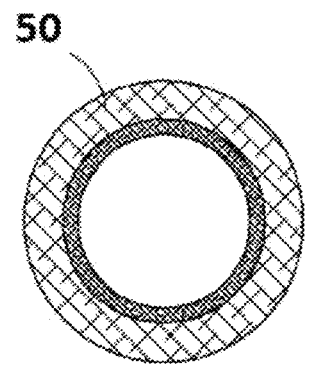
Figure 8B:
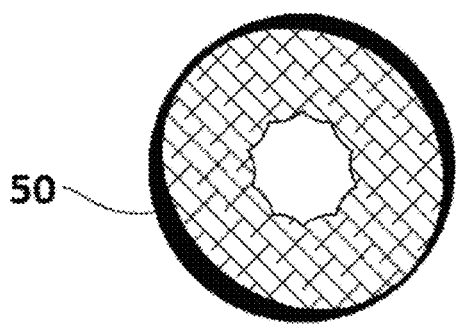
Figure 8E:
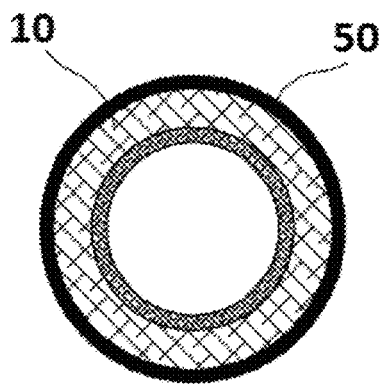
Figure 8C:
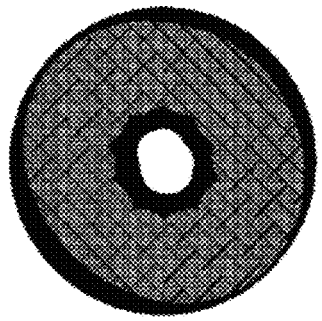

FIG. 7 is a view illustrating an actual product comparison between a braid manufactured by an apparatus for heat-treating an inner side surface of a braid for a hollow fiber membrane for a water treatment according to the present invention and a conventional braid, and FIG. 8 is a view illustrating a comparison example between a braid manufactured by a conventional method and a braid manufactured by an apparatus for heat-treating an inner side surface of a braid for a hollow fiber membrane for a water treatment according to the present invention.

The embodiment in FIG. 8 will be first described with reference to (a) showing the braid formed of the conventional steel wire in FIG. 7 and (b) showing the braid of the present invention. In case of the braid woven in a state where the apparatus 1 for heat-treating an inner side surface is not employed, as seen in (a), the conventional braid may have a disadvantage in the way that the inner diameter is small at the cross section of the inner side surface, and since the inner and outer diameters are deformed, the circularities of the inner and outer diameters are low, and in particular, a plurality of loops 30 and mows 40 are formed on the surface of the inner diameter.

Moreover, as seen in (b), the membrane thin film 50 remains coated, so the thickness of the thin film is uneven.

Furthermore, as seen in (c), a membrane liquid may penetrate even into the inner diameter, so the inner diameter may be narrowed.

The braid 10 woven using the heat treatment apparatus 1 of the present invention, however, has inventive features in the way that as seen in (d), the inner diameter is large, and the circularities of the inner and outer diameters are accurate, and in particular, the surfaces of the inner and outer diameters are formed even, and there are not any loop and mow.

In addition, as seen in (e), the thickness of the thin film is even in a state where the membrane 50 has been coated, and the tissue of the inner side surface of the braid 10 becomes dense.

The braid 10 may allow to expand the inner diameter thereof, thus increasing the flow rate when contaminated water passes through the membrane film (not illustrated), so the purification efficiency of the contaminated water per a membrane area of the membrane can be increased, whereby the water penetration performance can be enhanced, and the cost for the manufacturing of the contaminated water purification apparatus can be saved.

The tissue of the inner side surface of the braid 10 may be made dense, and the inner side surface thereof may become durable, and the compressive strength can be increased. When an external impact is applied or it is used for a long time or the contaminated water passes through the membrane film, the pressure increases, for which the membrane film might be deformed and contracted, thus significantly degrading the water penetration performance of the membrane film. In the present invention, the high compressive strength may contribute to the preventions of any deformation and contraction of the membrane film, so the water penetration performance and the filtration reliability can be enhanced, and the service life of the hollow fiber reinforcement membrane can be extended.

Since the circularity of the inner diameter of the braid 10 can be increased, and the tissue of the inner side surface can be made dense, the circularity of the outer diameter can be increased, the circular shape cannot be easily deformed by an external force, for example, the pressure of the membrane film during the procedure where it passes through the drawing device (not illustrated) of the weaving machine, the procedure where the braid 10 is loaded and the coating work of the membrane. Any eccentricity can be minimized during the coating work of the membrane thin film, so the thin film having an even thickness can be manufactured. In this way, the physical property can be improved, and the water penetration performance and the filtration reliability can be enhanced.

The tissue of the inner side surface of the braid 10 can be made dense, and the tissue of the outer side surface thereof is looser and softer than the inner side surface, which may allow to provide a good moisture absorption of the membrane liquid. For this reason, the adhering force of the membrane film with respect to the braid 10 can be raised, thus increasing the peeling strength of the membrane member. Moreover, if the pressure of the membrane liquid is high during the coating work of the membrane film, the liquid may enter into the inner diameter of the braid, thus causing the narrowing of the inner diameter. At this time, since the inner side surface of the braid 10 is dense, the narrowing phenomenon does not occur, by which the water penetration performance and the filtration reliability can be enhanced.

In addition, since the loop or the mow can be removed from the inner side surface of the braid 10, any resistance to the flow passage can be minimized while increasing the flow rate, and the weaving states at the outer side of the braid can be even.

The present invention is able to prevent the degradation of the physical property of the membrane, for example, an uneven weaving state at the outer side of the braid and any leakage due to the uneven coating for the presence of the loop or the mow.

Furthermore, since the inner side surface of the braid 10 is previously heat-treated and contracted, the contraction ratio of the braid 10 can be reduced, and the inner diameter contraction and the longitudinal contraction due to the contraction of the braid 10 by the heat before and after the coating work of the membrane can be prevented.

In the present invention, the weaving braid has been described as an embodiment of the present invention, but the present invention may be applied to the knit braid. When the braid of the present invention is actually used, it may be used at a woven tube for coating an electric wire to prevent any short circuit at a connection portion of the electric wire in case of a typical electric or electronic device.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An apparatus for heat-treating an inner side surface of a braid for a hollow fiber membrane reinforcement for a water treatment, comprising:

a heating core including a heating part forming a top portion of the heating core and having a diameter smaller than a diameter of other portion of the heating core, wherein the heating core is made of a copper or a copper alloy;

a heater inserted into the heating core and configured to heat the heating core by electric power received through an electric wire coated with a braid;

a hollow tubular shaft through which the electric wire passes, wherein the hollow tubular shaft includes a male screw part formed at a circumference of a top portion of the hollow tubular shaft;

a hollow clamping nut configured to cover a bottom portion of the heating core and the top portion of the hollow tubular shaft, wherein the hollow clamping nut includes a female screw part thread-engaged with the male screw part of the hollow tubular shaft and formed at an inner surface of a lower portion of the hollow clamping nut; and an installation part including a shaft fixing part having a tubular body disposed at a center portion of the installation part and to which a lower portion of the hollow tubular shaft is engaged, and a bracket protruding from a circumference of the shaft fixing part 510 for a sake of an installation of the apparatus at a braiding machine.

2. The apparatus of claim 1, wherein the heating core further includes a heater engaging groove formed upward from the bottom portion of the heating core inside the heating core and forming a cavity inside the heating core, and an engaging support part protruded at a circumference of the bottom portion of the heating core, and wherein the cavity forms an interior of the heating core and having an open bottom;

wherein the heater includes an insulator which covers a bottom portion of the heater and protrudes from the bottom portion of the heater, wherein the heater is inserted in the heater engaging groove from the bottom portion of the heating core, and wherein the electric wire is connected to the heater through the insulator such that the heater receives the electric power through the electric wire and generates heat, wherein the hollow tubular shaft further includes an insulator support groove formed at an inner side of the top portion of the hollow tubular shaft, wherein a lower side of the insulator is seat on the insulator support groove, and wherein the hollow tubular shaft contacts close to the lower side of the engaging support part of the heating core with an insulation washer being interposed between the heating core and the top portion of the hollow tubular shaft, and wherein the hollow clamping nut further includes an engaging shoulder protruded from a top portion of the hollow clamping nut toward an inside of the hollow clamping nut, wherein the hollow clamping nut is configured to cover the engaging support part of the heating core and the top portion of the hollow tubular shaft, wherein the engaging shoulder is configured to hook and support a top portion of the engaging support part, and wherein the engaging support part of the heating core 100 is configured to be pressed when the male screw part is engaged with the female screw part and the hollow clamping nut is tightened.

3. The apparatus of claim 1, wherein the heating core further includes an engaging support part formed at a circumference of an intermediate part from a lower side of the heating part, wherein the heater is configured to cover the bottom portion of the heating core and to heat the heating core, wherein the heater further includes an insulator which covers a circumference of the heater and protrudes downward from a bottom end of the heater, and wherein the insulator covers the electric wire connected to the heater such that the heater receives electric power through the electric wire and generates heat, wherein the hollow tubular shaft further includes an insulator support groove formed at an inner side of the top portion of the hollow tubular shaft, and wherein a lower side of the insulator is seat on the insulator support groove, and wherein the hollow clamping nut further includes an engaging shoulder protruded from a top portion of the hollow clamping nut toward an inside of the hollow clamping nut, wherein the hollow clamping nut is configured to cover the engaging support part of the heating core and the top portion of the hollow tubular shaft, wherein the engaging shoulder is configured to hook and support a top portion of the engaging support part, and wherein the engaging support part of the heating core is configured to be pressed and fixed when the male screw part is engaged with the female screw part and the hollow clamping nut is tightened.

4. The apparatus of claim 1, wherein the heating part of the heating core further includes a chrome plating layer formed thereon to provide a smooth surface illumination.

5. A braid for a hollow fiber membrane reinforcement for a water treatment prepared using an apparatus for heat-treating an inner side surface of a braid for a hollow fiber membrane reinforcement for a water treatment of claim 1.

* * * * *